July 10, 1934.  W. W. HODGSON  1,966,392
BODY MAKER
Filed Oct. 13, 1932  5 Sheets-Sheet 1

Inventor:
William W. Hodgson
By Sturtevant, Mason & Porter
Attorneys.

July 10, 1934.  W. W. HODGSON  1,966,392
BODY MAKER
Filed Oct. 13, 1932   5 Sheets-Sheet 3

Inventor:
William W. Hodgson
By Sturtevant, Mason & Porter
Attorneys.

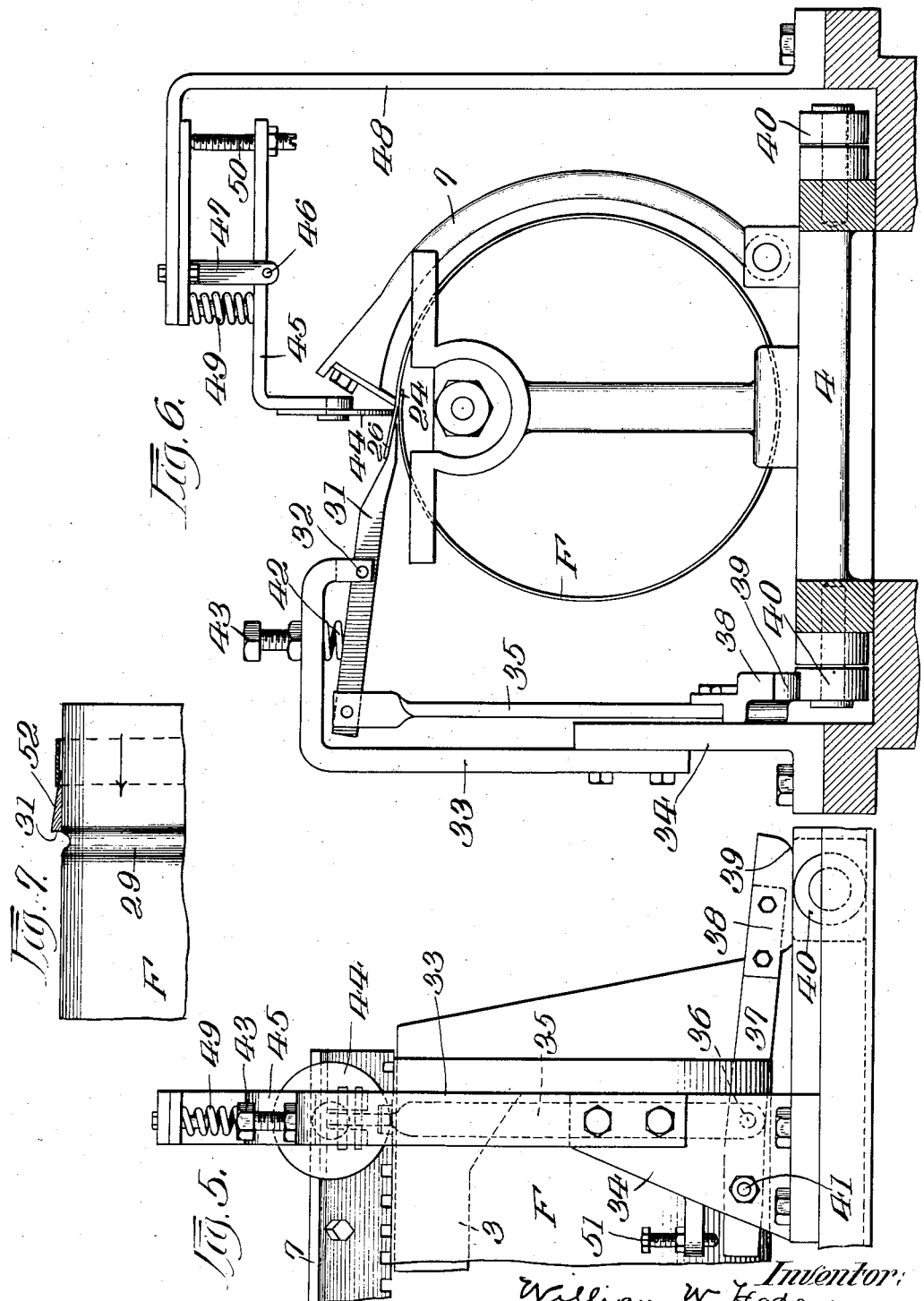

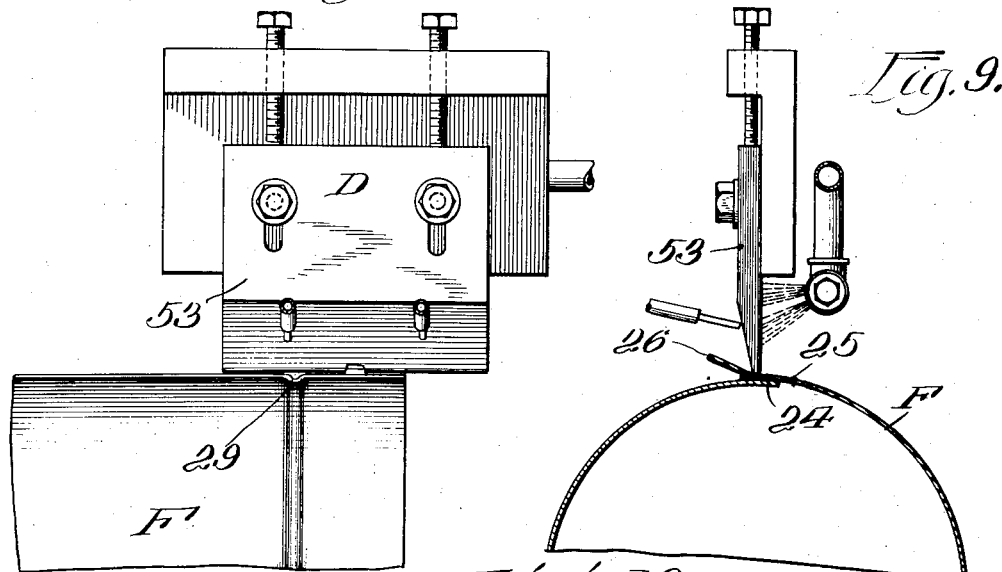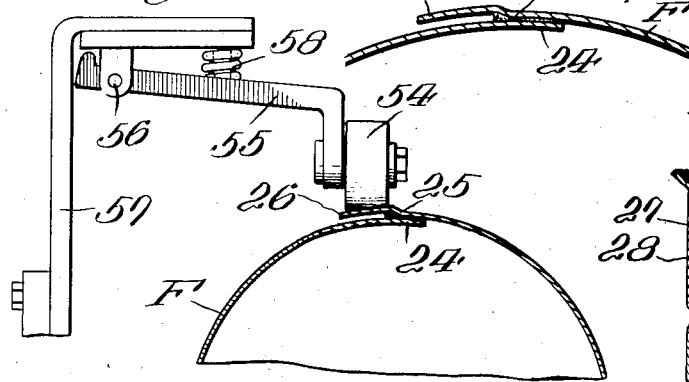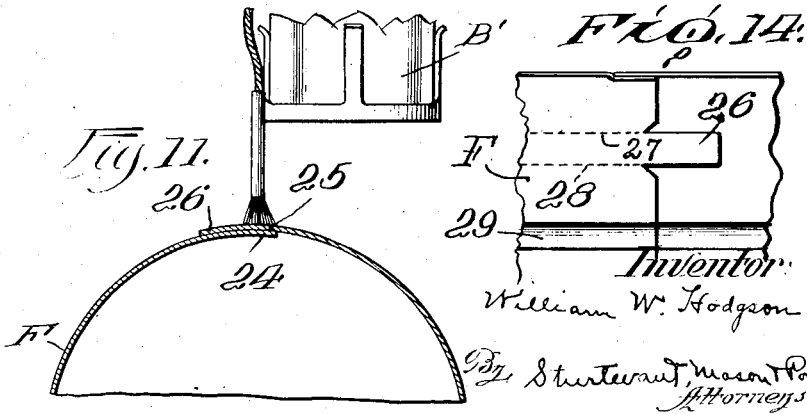

Patented July 10, 1934

1,966,392

UNITED STATES PATENT OFFICE 1,966,392

BODY MAKER

William W. Hodgson, Chicago, Ill., assignor to Continental Can Company, Inc., New York, N. Y., a corporation of New York Application October 13, 1932, Serial No. 637,664

5 Claims. (Cl. 113—9)

The invention relates to new and useful improvements in a can body maker, and more particularly to a body maker for producing a cylindrical can body.

An object of the invention is to provide a body maker for the shaping of a can body blank having score lines and a projecting tongue forming a ripping strip, with means for shaping and positioning the tongue relative to the body so as to limit the extent of the solder bond at the base of the tongue.

These and other objects will in part be obvious and will in part be hereinafter more fully disclosed.

In the drawings which show by way of illustration one embodiment of the invention—

Fig. 5 is a side view of a portion of the body maker and showing the attachment thereto for bending and shaping the tongue;

Fig. 6 is a sectional view on the line 6—6 of Fig. 1;

Fig. 7 is a sectional view longitudinally of the machine through a can body blank, the tearing tongue and the cam-shaped lifting member which raises the tongue and aids in the bending and shaping of the same;

Fig. 8 is a longitudinal sectional view through a portion of the body maker showing the soldering a portion of the body maker showing the soldering irons for applying solder to the side seam;

Fig. 9 is a sectional view on the line 9—9 of Fig. 1, and showing the parts in Fig. 8 in end view;

Fig. 10 is a sectional view on the line 10—10 of Fig. 1;

Fig. 11 is a sectional view on the line 11—11 of Fig. 1;

Fig. 12 is a longitudinal sectional view through a portion of the can showing a formed bead and an inserted collar which contacts therewith;

Fig. 13 is a transverse sectional view through the side seam of a finished cam body showing the solder bond at the base of the tongue and the spacing of the tongue from the body wall, and Fig. 14 is a side view of a portion of a can at the side seam, and showing the tearing tongue and the strengthening bead.

The invention has to do with a body maker and more particularly to a body maker for forming body blanks into cylindrical can bodies, and the joining of the side edges of the body blank to form a lap seam. The body blank is rolled into cylindrical form by forming rolls and a cooperating member contacting with the body blank as it passes through the rolls. It is often desirable to provide a can body with a bead extending circumferentially about the can body for strengthening the can body and for other purposes. It has been the usual practice to form a can body, and then by a separate operation, subject the formed can body to bead forming rolls. In the present body maker, the beads are formed in the body blank at the same time that the blank is rolled into cylindrical form, and the blank is guided relative to the bead forming devices, so that the bead will, with certainty, be placed in the body blank at a predetermined distance from the edge of the blank and the end of the formed can body. The beading devices in the present embodiment of the invention are placed in the forming rolls, and as the body blank is progressively curved, it is also progressively beaded. In the forming of a can body having score lines and a projecting tongue providing a ripping strip, considerable difficulty has been experienced in the soldering of the side seam, as the solder bond extends out along the tongue making it difficult to lift the tongue and attach the key thereto. In the present machine, means is provided for bending and shaping the tongue so as to space the tongue away from the body wall and thus limit the solder bond and leave the tongue free to receive the key.

Figure 1:
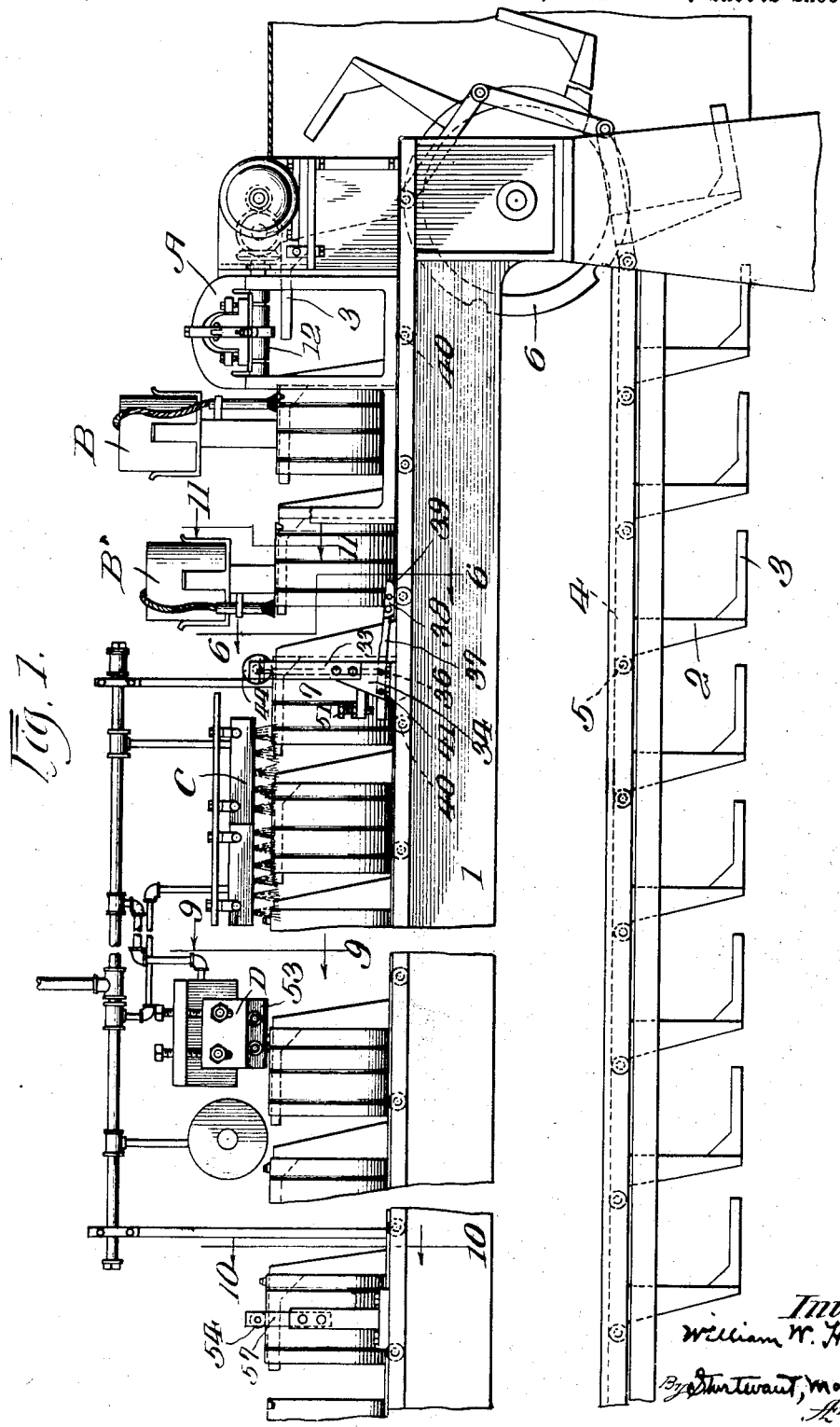
Figure 1 is a side view showing more or less diagrammatically a portion of the body maker embodying the improvements.
Figure 2:
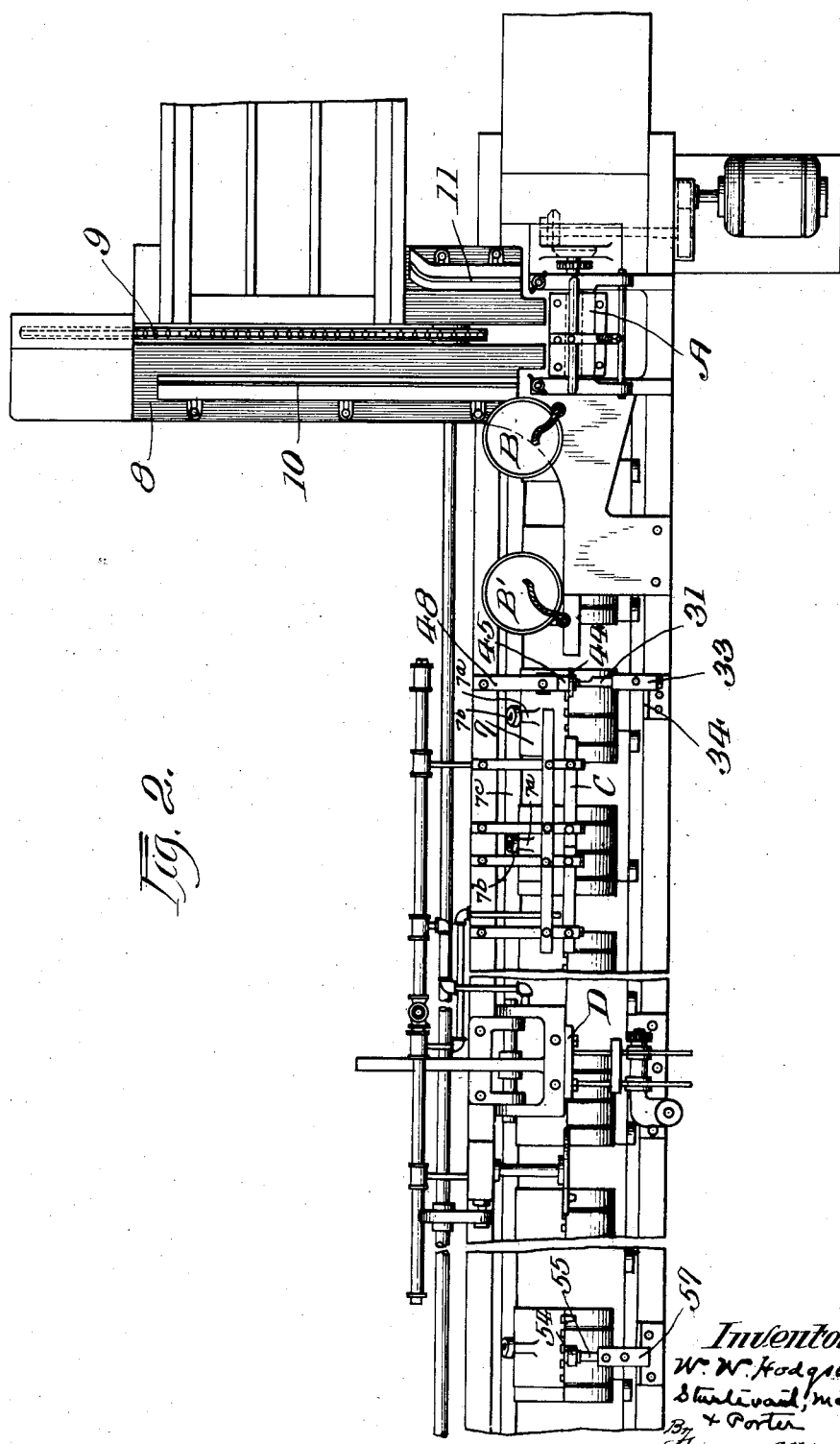
Fig. 2 is a plan view of the same.
Figure 3:
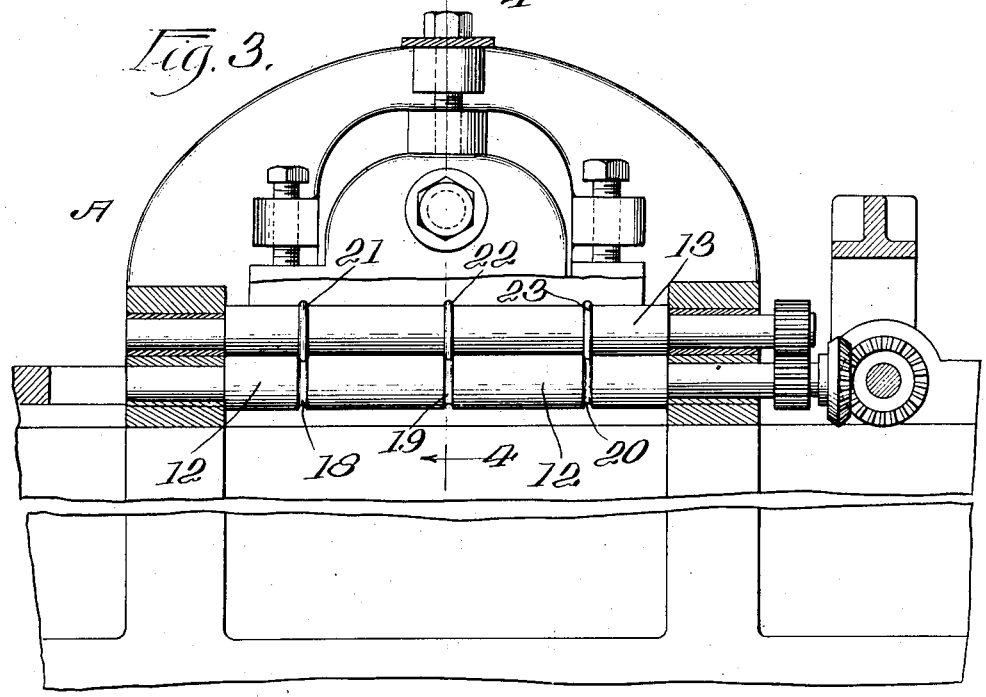
Fig. 3 is a longitudinal sectional view through the forming head and showing the forming rolls in side elevation.
Figure 4:
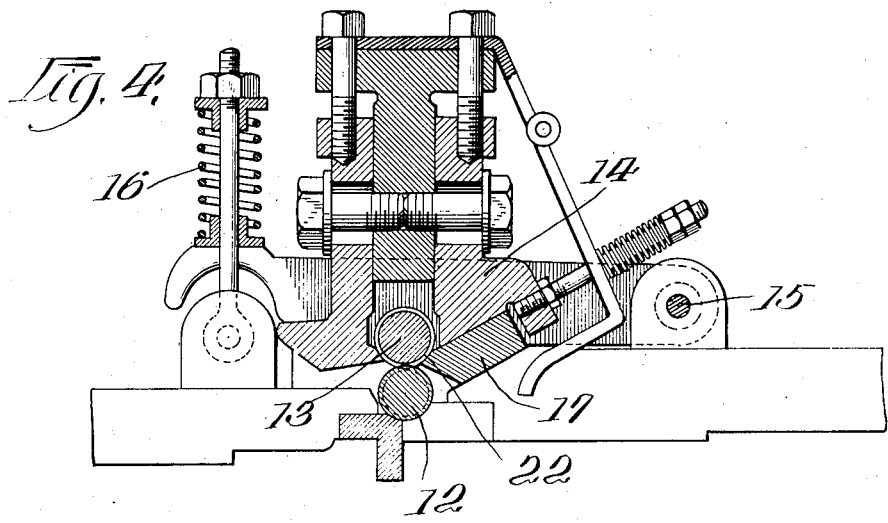
Fig. 4 is a sectional view on the line 4—4 of Fig. 3.

It is thought the invention will perhaps be better understood by a description of the illustrated embodiment thereof. In Fig. 1 of the drawings, there is shown a body maker which includes a supporting frame 1 on which traveling anvils are carried. These traveling anvils are illustrated more or less diagrammatically in the drawings, and each consists of a supporting bracket 2 and a projecting anvil horn 3. The bracket is attached to a base member 4, and the base members of the several traveling anvils are pivoted together, as indicated at 5, thus providing a continuously traveling means around which the can bodies are placed for soldering. These traveling anvils engage spiders 6, one of which is indicated in Fig. 1 of the drawings. Suitable means is provided for moving these traveling anvils. The traveling anvil first passes a body forming station A where the can body blank is rolled into cylindrical form and placed on the anvil. Associated with each traveling anvil is a clamping member 17. The clamping member is pivoted to the carriage carrying the anvil and travels with the anvil; said clamping member has an arm 7a projecting therefrom carrying a roller 7b, which contacts with a cam rail 7c extending along the frame. This cam rail is so shaped as to clamp the body blank against the anvil after the edges have been overlapped, as clearly shown in Fig. 6 of the drawings. The traveling anvils convey the can bodies thereon first to fluxing devices indicated at B and B', and then to pre-heating devices indicated at C, and to a series of soldering irons, one of which is indicated at D.

The body blanks are fed from a stack on to a feeding-in table 8 along which they are conveyed by a traveling chain 9. There is an adjustable guide rail 10 and an adjustable guide rail 11, and the body blank is passed between these guide rails and thus directed to the forming rolls which are indicated at 12 and 13. The forming roll 13 is mounted in a swinging bracket which is a part of the forming head. The bracket is indicated at 14. It is pivoted at 15, and the springs 16, 16, one at each side of the bracket, holds the forming roll 13 yieldingly in contact with the body blank as it passes between the forming rolls. As the forward edge portion of the body blank issues from the forming rolls, it contacts with a shaping iron 17 which curves the body blank into cylindrical form. The traveling anvils are so timed that the body blank is curved about the traveling anvil and placed thereon. The can body maker as described above is of the type disclosed in the patent granted I. F. Warme, April 21, 1914, No. 1,094,179, and further detailed description thereof is not thought necessary.

The forming rolls, as shown in the drawings, are each provided with gears which mesh and are positively driven. The lower forming roll 12, as shown in the drawings, is provided with three circumferential recesses 18, 19 and 20. The upper forming roll 13 is provided with three projecting ribs 21, 22 and 23, which cooperate, respectively, with the recesses 18, 19 and 20. The ribs are shaped to conform to the recesses, and contacting with the blank, will roll a bead in the body blank. Inasmuch as the body blank passes through the forming rolls in a definite lateral position, due to the guides 10 and 11, the beads formed in the body blank will be parallel with the side edges of the body blank and located the same distance from the edge of the blank in the successively formed can bodies. As shown in the drawings, the forming rolls are provided with three bead forming devices. The number of bead forming devices may be varied, and one only may be formed, if desired.

In Figures 13 and 14 of the drawings, a portion of a finished can body is shown. Said can body, which is indicated at F, has an inner lapping portion 24 and an outer lapping portion 25. This outer lapping portion 25 is provided with a projecting tongue 26, and the body is scored along lines 27 and 28, preferably on the inner surface thereof, to form a tearing strip. This projecting tongue is placed on a key and is wound thereon for tearing away the metal along the scoring lines. The can body is provided with a bead 29 therein, which must have a definite relation to the tearing tongue and the edge of the can body. The ends of the lapped portions forming the side seam must be evenly placed in order to be formed into a flange and finally rolled into a double seam. The tearing strip type of can is usually provided with an inserted collar 30, which collar is made in such dimensions that it may be forced into the completed can body and make frictional contact therewith. The collar is preferably caused to contact with the bead and may be shaped so as to engage the bead. This collar should have a certain position in the can body relative to the end of the can body and the score lines, and therefore, it is essential that the bead should be placed at a predetermined position to facilitate the placing of the collar. In the present body, where the bead is rolled into the can body by the forming rolls, it will always be placed at a predetermined distance from the edge of the can body blank and the end of the can body.

The can body after it is placed on the horns, and the edges lapped and clamped for soldering, then passes through fluxing devices which are of the usual character and are indicated at B and B' in Fig. 1 of the drawings. The can body is then presented to a tongue shaping mechanism which operates to bend the tongue and offset it slightly from the wall of the can body. This is accomplished by a lifting finger 31 which is pivoted at 32 to an overhanging arm 33 carried by a bracket 34 which in turn is secured to the frame of the machine. Attached to the outer end of the finger 31 is a link 35. This link 35 is pivoted at 36 to a lever 37. The lever 37 carries a block 38 provided with a curved portion 39. The base members 4 are not only pivotally connected, but are provided with rollers 40, 40 at each side thereof. The rollers on one side pass in succession beneath the block 38 carried by the lever 37. This lever is pivoted at 41 to the bracket 34. As the roller passes beneath the block, it will raise the lever, and then will raise the outer end of the finger, lowering the forward end of the finger. A spring 42 placed between the overhanging arm 33 and the finger will force the outer end of the overhanging arm downwardly and raise the finger. A bolt 43 is provided for positioning the spring 42 and for varying the tension thereon.

The tongue forming mechanism also includes a roller 44 carried by a lever 45 which is pivoted at 46 to a bracket 47 carried by a standard 48 which is secured to the frame of the machine. A spring 49 forces the roller downwardly with a yielding pressure, and a stop screw 50 limits the downward movement of the roller. This enables the pressure of the roller on the metal parts passing beneath the same to be varied. There is also a stop screw 51 which limits the downward movement of the lever 37 and the upward movement of the finger 31. As the can bodies on the traveling horns pass through the tongue shaping mechanism, the finger 31 is lowered into contact with the body so that it will pass beneath the tongue. The block 38 is adjustable and so positioned that the finger will be dropped into contact with the can body just in time to pass underneath this tongue. The finger, as clearly shown in Fig. 7, has its upper face 52 inclined to form a knife edge which will, with certainty, pass between the tongue and the wall of the can body. Just as the finger passes beneath the tongue, the roller 44 will engage the tongue between the clamping wing members 7 and will bear down on the tongue. When the finger 31 is well underneath the tongue, the block 38 passes off the roller, and the spring 42 will raise the finger until the lever contacts with the stop 51. This results in an offsetting of the tongue 26 relative to the outer lapping portion 25 of the can body. This off-setting of the tongue is clearly shown in Fig. 9. The metal is bent to a sufficient extent so as to retain the shaping which is given thereto. The can body is next presented to a pre-heating mechanism, and thence passed underneath a soldering mechanism, as shown in Fig. 9, where solder is applied to the side seam. This soldering mechanism includes a plurality of soldering irons 53 which contact with the container body and solder is supplied to the side seam in the usual way. After the side seam has been soldered, the tongue is then carried beneath a roller 54 supported by a lever 55 pivoted at 56 to a bracket 57. A spring 58 carried by the bracket and bearing on the lever, yieldingly forces the roller 54 into contact with the tongue. The tongue is preferably bent upward to a slightly greater extent than is desirable in the finished can body, in order to limit the extent of the solder bond at the base of the tongue. This roller will press the tongue back into comparatively close relation with the wall of the can body, but will leave the tongue free and spaced from the wall of the can body so that a key may be readily placed thereon, see Figures 10 and 13.

From the above it will be apparent that in the improved body maker, the body wall is provided with a bead which is properly located relative to the end of the can body and the tearing tongue, and the tearing tongue is also shaped so as to limit the extent of the solder bond at the base of the tongue and properly position the tongue for the free placing of the key thereon.

It is obvious that minor changes in the details of construction and the arrangement of the parts may be made without departing from the spirit of the invention as set forth in the appended claims.

Having thus described the invention, what I claim as new and desire to secure by Letters Patent, is—

1. A can body forming machine comprising traveling anvils, forming rolls for forming and placing a can body on each anvil, which can body is provided with a tearing tongue projecting from the edge thereof at the side seam, soldering means for applying solder to the side seam, and means for engaging said tongue for offsetting the tongue from the wall of the can body prior to the applying of solder to the side seam.

2. A can body forming machine comprising traveling anvils, forming rolls for forming and placing a can body on each anvil, which can body is provided with a tearing tongue projecting from the edge thereof at the side seam, soldering means for applying solder to the side seam, a lifting finger adapted to pass beneath said tongue for lifting the same, and a pressure roller contacting with the tongue and cooperating with said finger to offset the tongue from the wall of the can body.

3. A can body forming machine comprising traveling anvils, forming rolls for forming and placing a can body on each anvil, which can body is provided with a tearing tongue projecting from the edge thereof at the side seam, soldering means for applying solder to the side seam, a lifting finger adapted to pass beneath said tongue, said finger being tapered to a knife edge at the side thereof approached by the tongue, and a pressure roller cooperating with said finger as it lifts the tongue for forming an offset portion in said tongue.

4. A can body forming machine comprising traveling anvils, forming rolls for forming and placing a can body on each anvil, which can body is provided with a tearing tongue projecting from the edge thereof at the side seam, soldering means for applying solder to the side seam, and means for engaging the tongue for bending the same outwardly away from the body of the can at the base of the tongue for limiting the extent of the solder bond.

5. A can body forming machine comprising traveling anvils, forming rolls for forming and placing a can body on each anvil, which can body is provided with a tearing tongue projecting from the edge thereof at the side seam, soldering means for applying solder to the side seam, means for engaging the tongue for bending the same outwardly away from the body of the can at the base of the tongue for limiting the extent of the solder bond, and means for engaging said tongue after the solder bond is completed for placing said tongue in a position substantially parallel with the body wall and spaced therefrom.

WILLIAM W. HODGSON.